United States Patent
Kim et al.

(10) Patent No.: US 8,619,217 B2
(45) Date of Patent: Dec. 31, 2013

(54) COLOR FILTER SUBSTRATE AND LIQUID CRYSTAL DISPLAY HAVING THE SAME

(75) Inventors: Jong Seong Kim, Seoul (KR); Sangil Kim, Yongin-si (KR); WooJae Lee, Yongin-si (KR); Min ho Yoon, Suwon-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 278 days.

(21) Appl. No.: 12/774,738

(22) Filed: May 6, 2010

(65) Prior Publication Data
US 2011/0116026 A1 May 19, 2011

(30) Foreign Application Priority Data
Nov. 13, 2009 (KR) .................. 10-2009-0109716

(51) Int. Cl.
*G02F 1/1333* (2006.01)
*G02F 1/1335* (2006.01)

(52) U.S. Cl.
USPC ......................................... 349/106; 349/115

(58) Field of Classification Search
USPC ........................................................ 349/115
See application file for complete search history.

(56) References Cited

U.S. PATENT DOCUMENTS

| 6,657,687 B2 * | 12/2003 | Takizawa ...................... 349/106 |
| 6,724,459 B2 | 4/2004 | Yoon |
| 7,009,668 B2 * | 3/2006 | Van De Witte et al. ........ 349/113 |
| 2002/0085147 A1 * | 7/2002 | Ko ................................. 349/106 |
| 2002/0150698 A1 * | 10/2002 | Kawabata ...................... 428/1.1 |

FOREIGN PATENT DOCUMENTS

KR 1020020031983 5/2002

\* cited by examiner

*Primary Examiner* — Wen-Ying P Chen
(74) *Attorney, Agent, or Firm* — F. Chau & Associates, LLC

(57) ABSTRACT

A liquid crystal display includes a first base substrate, a second base substrate facing the first base substrate, a liquid crystal layer disposed between the first substrate and the second substrate, a non-transmissive layer on the first base substrate to absorb light, a plurality of color filter layers arranged on the non-transmissive layer and including a cholesteric liquid crystal to change a wavelength of light and reflect the light, an alignment layer arranged between the non-transmissive layer and the color filter layers to align the cholesteric liquid crystal, a first electrode on the color filter layers, and a second electrode on the second base substrate.

19 Claims, 11 Drawing Sheets

US 8,619,217 B2

COLOR FILTER SUBSTRATE AND LIQUID CRYSTAL DISPLAY HAVING THE SAME

CROSS-REFERENCE TO RELATED APPLICATION

This application claims priority to Korean Patent Application No. 2009-109716 filed on Nov. 13, 2009, the contents of which are herein incorporated by reference in its entirety.

BACKGROUND

1. Technical Field

The present invention relates to a color filter substrate capable of improving a display quality thereof and a liquid crystal display having the color filter substrate.

2. Discussion of the Related Art

In general, a liquid crystal display includes an array substrate, a color filter substrate, a backlight assembly, and a liquid crystal layer disposed between the array substrate and the color filter substrate. The array substrate includes a pixel, the backlight assembly provides a light to the liquid crystal layer, and the color filter substrate includes a color filter through which a white light from the liquid crystal layer is transmitted to allow the white light to have a predetermined color.

As an alternative to a transmissive type color filter as described above, a reflective type color filter used in conjunction with cholesteric liquid crystal has been developed. The reflective color filter reflects light to change a wavelength of the light, so that the light has a desired color. The wavelength of the light reflected by the reflective type color filter is controlled by a pitch of the cholesteric liquid crystal.

SUMMARY

Embodiments of the present invention provide a color filter substrate capable of improving a display quality, and a liquid crystal display having the color filter substrate.

According to an embodiment, a color filter substrate includes a base substrate, a non-transmissive layer on the base substrate to absorb light and including concave-convex portions on a surface of the non-transmissive layer, a plurality of color filter layers on the non-transmissive layer and including a cholesteric liquid crystal to change a wavelength of light and reflect the light, and an alignment layer between the non-transmissive layer and the color filter layers to align the cholesteric liquid crystal.

According to an embodiments, a liquid crystal display includes a first base substrate, a second base substrate facing the first base substrate, a liquid crystal layer disposed between the first base substrate and the second base substrate, a non-transmissive layer on the first base substrate to absorb light and including concave-convex portions arranged on a surface of the non-transmissive layer, a plurality of color filter layers on the non-transmissive layer and including a cholesteric liquid crystal to change a wavelength of light and reflect the light, an alignment layer between the non-transmissive layer and the color filter layers to align the cholesteric liquid crystal, a first electrode on the color filter layers, and a second electrode on the second base substrate.

The non-transmissive layer includes convex portions protruded from an upper surface thereof. Further, the alignment layer and the color filter layers sequentially arranged on the non-transmissive layer have a concave-convex shape corresponding to the convex portions. Since the cholesteric liquid crystal of the color filter layers is aligned corresponding to the concave-convex shape of the alignment layer, the wavelength of the light reflected by the cholesteric liquid crystal may be determined by the cholesteric liquid crystal having the same pitch although a viewing angle is changed. Consequently, in the liquid crystal display having a color filter substrate including the color filter layers, the liquid crystal display may prevent deterioration in a display quality, which is caused by the change of the wavelength of the light reflected by the cholesteric liquid crystal as the viewing angle changes.

BRIEF DESCRIPTION OF THE DRAWINGS

The embodiments of the present invention will become readily apparent by reference to the following detailed description when considered in conjunction with the accompanying drawings wherein.

DESCRIPTION OF THE EMBODIMENTS

It will be understood that when an element or layer is referred to as being "on", "connected to" or "coupled to" another element or layer, it can be directly on, connected or coupled to the other element or layer or intervening elements or layers may be present. Like numbers may refer to like elements throughout the drawings and the specification.

Figure 1:
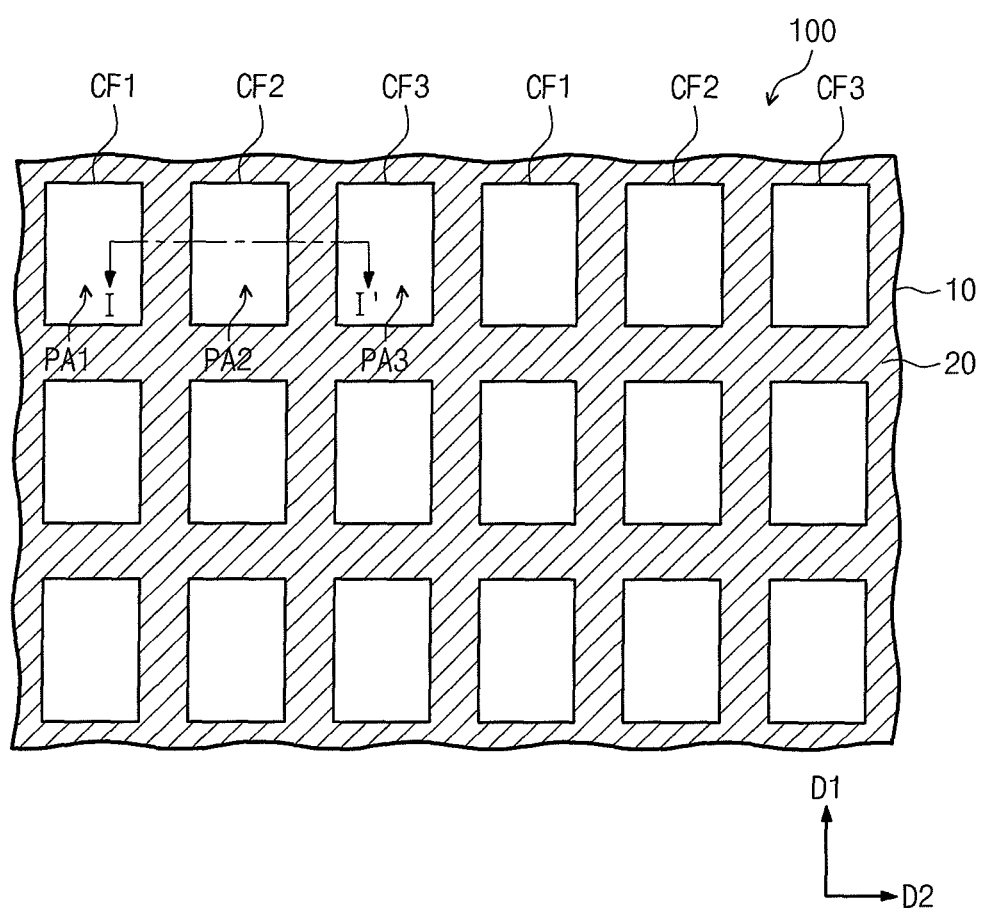
FIG. 1 is an enlarged plan view showing part of a color filter substrate according to an exemplary embodiment of the present invention.
Figure 2:
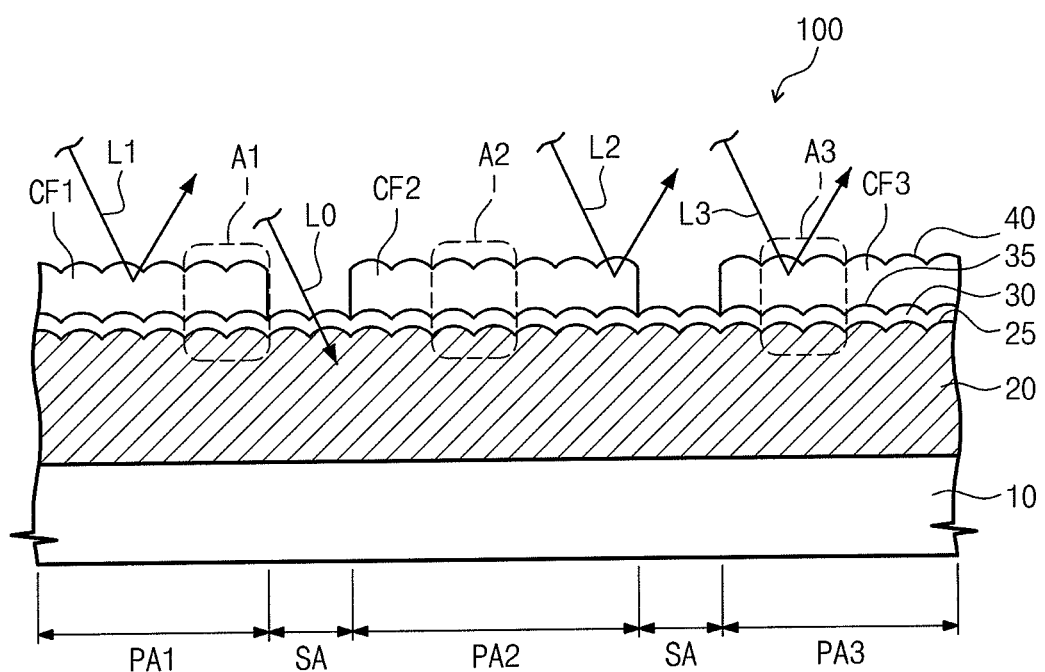
FIG. 2 is a cross-sectional view taken along a line I-I' of FIG. 1.

FIG. 1 is an enlarged plan view showing part of a color filter substrate according to an exemplary embodiment of the present invention, and FIG. 2 is a cross-sectional view taken along a line I-I' of FIG. 1.

Referring to FIGS. 1 and 2, a color filter substrate 100 includes a base substrate 10, a non-transmissive layer 20, an alignment layer 30 arranged on the non-transmissive layer 20, and a plurality of color filter layers arranged on the alignment layer 30.

The base substrate 10 includes a plurality of pixel areas having a first pixel area PA1, a second pixel area PA2, and a third pixel area PA3 and a peripheral area SA surrounding each of the pixel areas. The pixel areas are arranged both in a column direction that is substantially parallel to a first direction D1 and in a row direction that is substantially perpendicular to the first direction D1 to have a matrix pattern, and the pixel areas are spaced apart from each other.

The non-transmissive layer 20 includes a material that is not transparent or absorbs light, such as a resin including carbon. The non-transmissive layer 20 is arranged on the base substrate 10 corresponding to the pixel areas and the peripheral area SA. In addition, the non-transmissive layer 20 includes a plurality of concave-convex portions 25 arranged on an upper surface thereof. In a sectional view, a surface of each of the concave-convex portions 25 has a round shape.

The alignment layer 30 is arranged on the non-transmissive layer 20. The alignment layer 30 has a first concave-convex surface 35 corresponding to the concave-convex portions 25. The alignment layer 30 aligns cholesteric liquid crystals in the color filter layers.

The color filter layers are arranged on the alignment layer 30 in a one-to-one correspondence with the pixel areas. In other words, each color filter layer CF corresponds to one pixel area PA. According to an exemplary embodiment, the color filter layers include a first color filter layer CF1, a second color filter layer CF2, and a third color filter layer CF3. The first color filter layer CF1 is arranged on the alignment layer 30 corresponding to the first pixel area PA1, the second color filter layer CF2 is arranged on the alignment layer 30 corresponding to the second pixel area PA2, and the third color filter layer CF3 is arranged on the alignment layer 30 corresponding to the third pixel area PA3.

Each of the first to third color filter layers CF1, CF2, and CF3 includes the cholesteric liquid crystal twisted at different pitches from each other. In general, in the color filter layer including the cholesteric liquid crystal, the cholesteric liquid crystal is twisted in a helical fashion, and the pitch of the cholesteric liquid crystal is defined as a distance in which cholesteric liquid crystal molecules rotate 360° along the helical axis. In other words, the pitch is the width of one complete helix turn, measured parallel to the axis of the helix. If the pitch is defined as described above, the wavelength of the light reflected by the cholesteric liquid crystal may be increased as the pitch increases. More detailed descriptions of the above will be described with reference to FIGS. 3A to 3C.

Figure 3A:
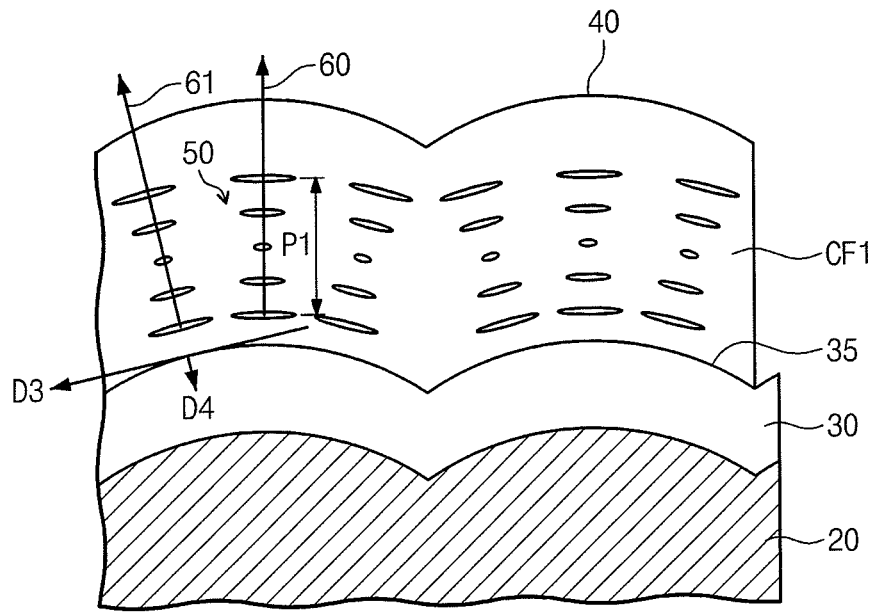
FIG. 3A is an enlarged view showing a first area of FIG. 2.
Figure 3B:
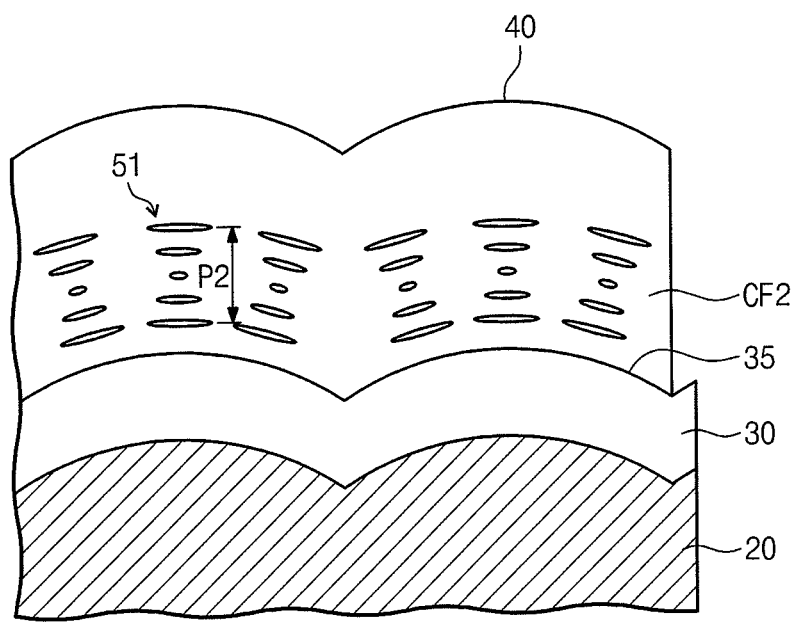
FIG. 3B is an enlarged view showing a second area of FIG. 2.
Figure 3C:
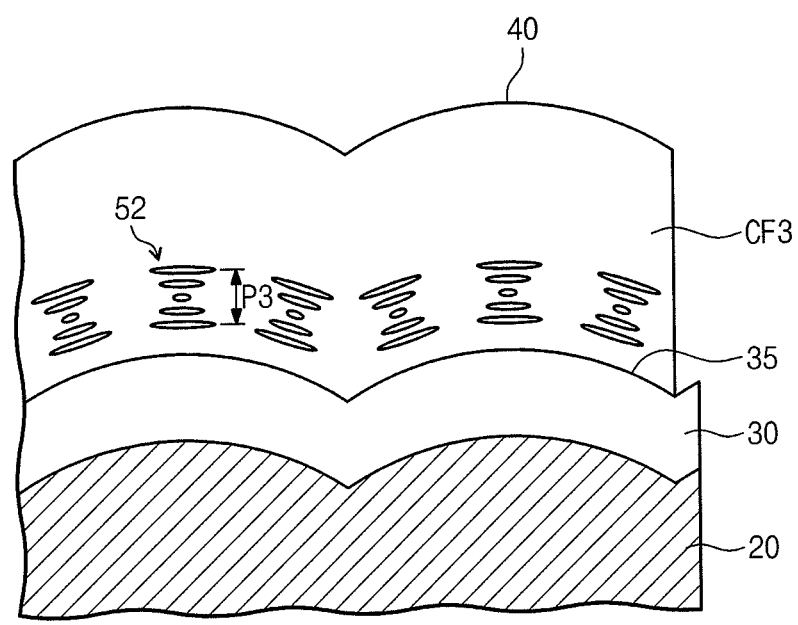
FIG. 3C is an enlarged view showing a third area of FIG. 2.

FIG. 3A is an enlarged view showing a first area A1 of FIG. 2, FIG. 3B is an enlarged view showing a second area A2 of FIG. 2, and FIG. 3C is an enlarged view showing a third area A3 of FIG. 2.

Referring to FIGS. 3A to 3C, the first color filter layer CF1 includes a first cholesteric liquid crystal 50 twisted at a first pitch P1, the second color filter layer CF2 includes a second cholesteric liquid crystal 51 twisted at a second pitch P2 that is smaller than the first pitch P1, and the third color filter layer CF3 includes a third cholesteric liquid crystal 52 twisted at a third pitch P3 that is smaller than the second pitch P2.

Referring again to FIG. 2, since the first to third cholesteric liquid crystals 50, 51, and 52 have different pitches from each other as described above, the lights reflected from the first to third color filter layers CF1, CF2, and CF3 have different wavelengths to have different colors from each other. For example, a first light L1 reflected by the first color filter layer CF1 may be a red light, a second light L2 reflected by the second color filter layer CF2 may be a green light having a smaller wavelength than that of the red light, and a third light L3 reflected by the third color filter layer CF3 may be a blue light having a smaller wavelength than that of the green light.

According to an exemplary embodiment, the pitch of the first to third cholesteric liquid crystals 50, 51, and 52 is controlled by adjusting an amount of chiral dopant that reacts with the first to third cholesteric liquid crystals 50, 51, and 52. Also, the pitch of the first to third cholesteric liquid crystals 50, 51, and 52 may be decided by controlling an amount of light exposure energy provided to a preliminary color filter layers including the cholesteric liquid crystal.

Each of the first to third color filter layers CF1, CF2, and CF3 has a second concave-convex surface 40 corresponding to the first concave-convex surface 35. Thus, a size of surface area of each of the first to third color filter layers CF1, CF2, and CF3 increases, thereby enhancing a reflection efficiency of each of the first to third color filter layers CF1, CF2, and CF3.

According to a structure of the color filter substrate 100 shown in FIG. 2, since the first to third color filter layers CF1, CF2, and CF3 are arranged in a one-to-one correspondence with the pixel areas, the non-transmissive layer 20 is not covered by the first to third color filter layers CF1, CF2, and CF3 in the peripheral areas SA. Therefore, a light L0 transmitting through the alignment layer 30 and traveling to the non-transmissive layer 20 is absorbed by the non-transmissive layer 20, and thus the first, second and third lights L1, L2, and L3 respectively reflected by the first, second and third color filter layers CF1, CF2, and CF3 are prevented from being mixed with each other.

Referring again to FIGS. 3A to 3C, the first cholesteric liquid crystal 50 is aligned corresponding to the shape of the first concave-convex surface 35 having the round shape in the sectional view. A tangent line direction at a point of the first concave-convex surface 35 is defined as a third direction D3 and a rotation axis (e.g., a normal line direction) of the first cholesteric liquid crystal 50 adjacent to the point is defined as a fourth direction D4, the third direction D3 is substantially perpendicular to the fourth direction D4.

As a result, a vertical light 60 that vertically travels with respect to the color filter substrate 100 (shown in FIG. 1) after being reflected by the first color filter layer CF1 and an inclined light 61 that travels in an inclined direction with respect to the color filter substrate 100 after being reflected by the first color filter layer CF1 are reflected by the first cholesteric liquid crystal 50 twisted with the same pitch, so that the vertical light 60 and the inclined light 61 have the same wavelength. As a result, a change in the wavelength of the light reflected by the first color filter layer CF1, which is caused by a viewing angle, may be prevented, thereby improving a color reproducibility of the color filter substrate 100.

Similar to the first cholesteric liquid crystal 50, since the second cholesteric liquid crystal 51 and the third cholesteric liquid crystal 52 are aligned corresponding to the first concave-convex surface 35, a change in the wavelength of the light reflected by the second color filter layer CF2 and the third color filter layer CF3, which is caused by the viewing angle, may be decreased.

Figure 4:
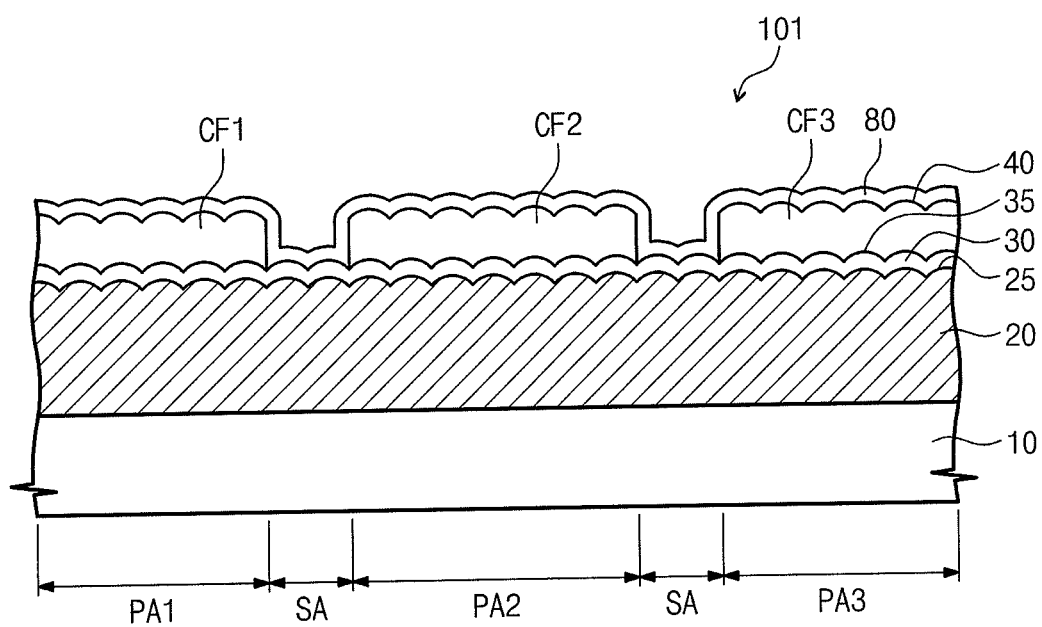
FIG. 4 is a cross-sectional view showing a color filter substrate according to an exemplary embodiment of the present invention.

FIG. 4 is a cross-sectional view showing a color filter substrate according to an exemplary embodiment of the present invention. In FIG. 4, the same reference numerals denote the same or similar elements as in the exemplary embodiment described in connection with FIG. 2.

Referring to FIG. 4, when compared to the color filter substrate 100 of FIG. 2, a color filter substrate 101 further includes a transparent electrode 80. The transparent electrode 80 may be a transparent conductive film, such as an indium tin oxide or an indium zinc oxide.

When the color filter substrate 101 is coupled with another substrate (not shown), the transparent electrode 80 may form an electric field with another electrode arranged on the substrate. For example, when the color filter substrate 101 is employed in a liquid crystal display, the transparent electrode 80 may form the electric field with a pixel electrode formed on an array substrate to control an alignment of the liquid crystal. More detailed descriptions of the above will be described with reference to FIGS. 5 to 10.

Figure 5:
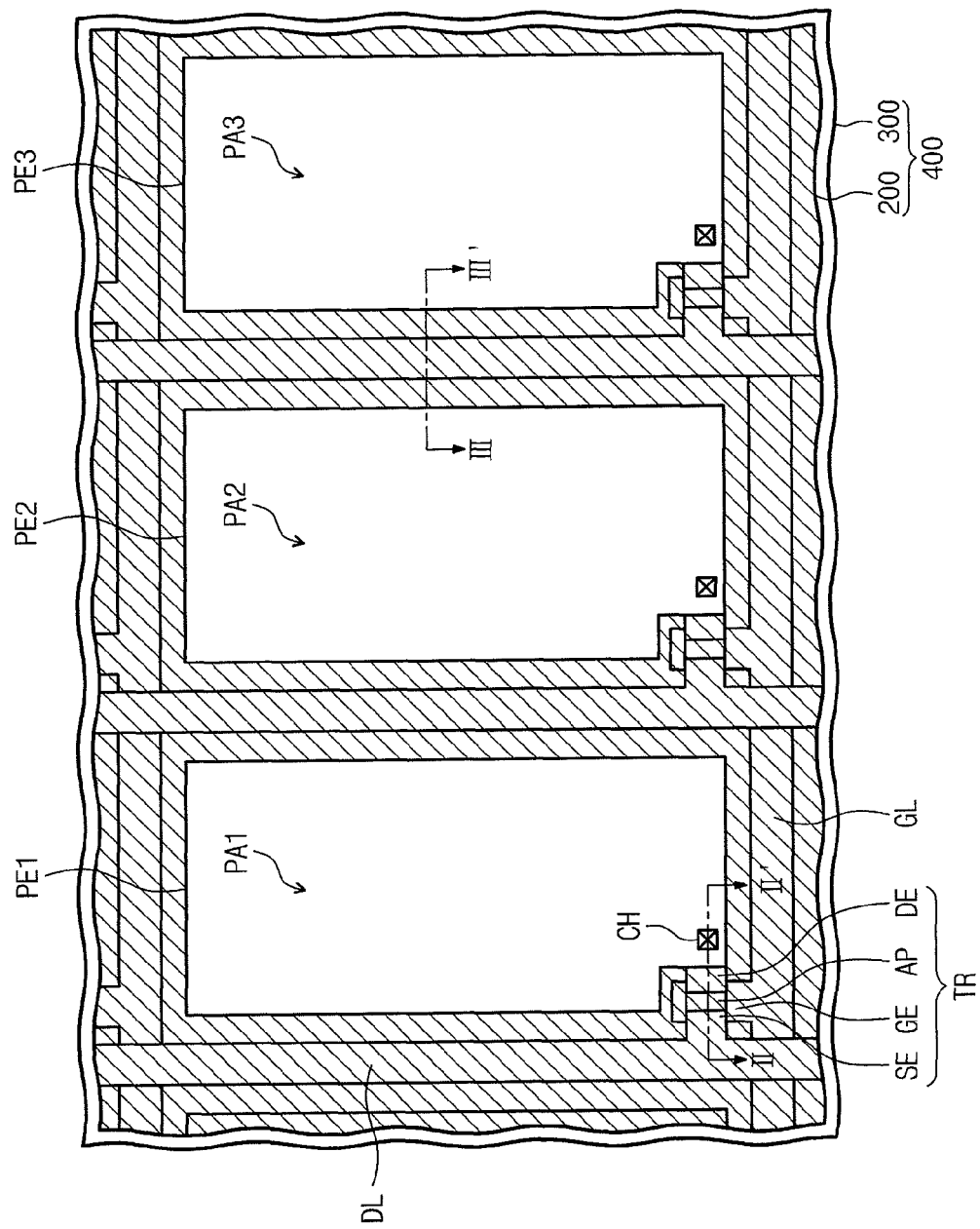
FIG. 5 is an enlarged plan view showing part of a liquid crystal display according to an exemplary embodiment of the present invention.
Figure 6:
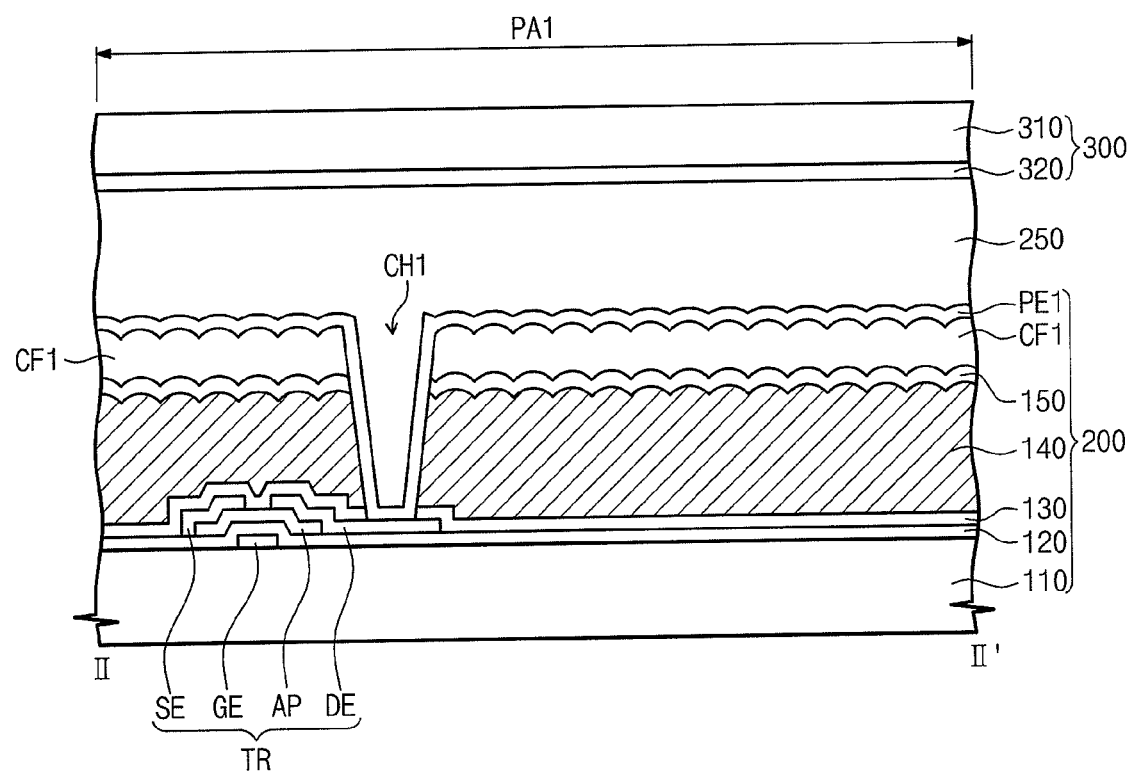
FIG. 6 is a cross-sectional view taken along a line II-II' of FIG. 5.
Figure 7:
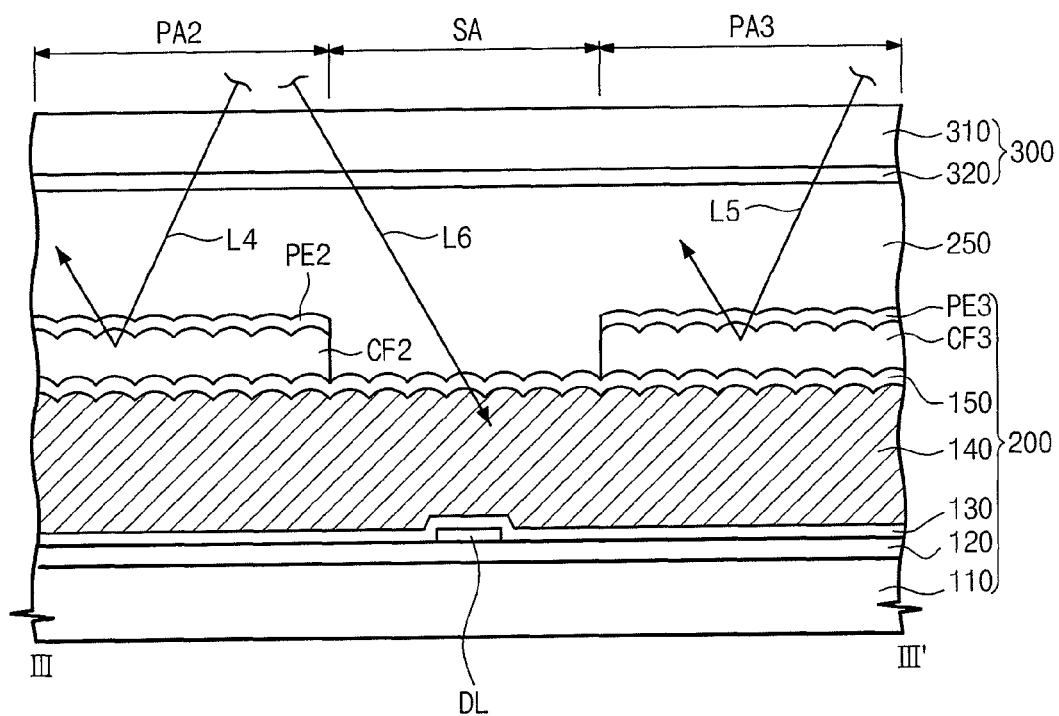
FIG. 7 is a cross-sectional view taken along a line of FIG. 5.

FIG. 5 is an enlarged plan view showing part of a liquid crystal display according to an exemplary embodiment of the present invention, FIG. 6 is a cross-sectional view taken along a line II-II' of FIG. 5, and FIG. 7 is a cross-sectional view taken along a line III-III' of FIG. 5.

Referring to FIGS. 5 and 6, a liquid crystal display 400 includes a first substrate 200, a second substrate 300 facing the first substrate 200, and liquid crystal 250 disposed between the first substrate 200 and the second substrate 300.

The first substrate 200 includes a first base substrate 110 having a plurality of pixel areas and a peripheral area surrounding each of the pixel areas. A structure of the liquid crystal display 400 corresponding to a first pixel area PA1, a second pixel area PA2, and a third pixel area PA3 is the same as a structure of the liquid crystal display 400 corresponding to remaining pixel areas.

The first base substrate 110 includes gate lines GL, data lines DL, a thin film transistor TR positioned in each of the first to third pixel areas PA1, PA2, and PA3, first, second, and third pixel electrodes PE1, PE2, and PE3 arranged to respectively correspond with the first to third pixel areas PA1, PA2, and PA3, first, second, third color filter layers CF1, CF2, and CF3 arranged to respectively correspond with the first to third pixel areas PA1, PA2, and PA3, a first non-transmissive layer 140, and an alignment layer 150.

Although not shown in FIGS. 5 and 6, an additional alignment layer may be arranged on the first to third pixel electrodes PE1, PE2, and PE3 to align the liquid crystal 250.

A structure of the first substrate 200 corresponding to the first pixel area PA1 is as follows. The gate lines GL and the data lines DL cross each other on the first base substrate 110, and the thin film transistors TR are electrically connected to their corresponding gate lines GL and data lines DL. More particularly, a thin film transistor TR includes a gate electrode GE branched from the gate line GL, a semiconductor pattern AP arranged on the gate electrode GE, a gate insulating layer 120 interposed between the gate electrode GE and the semiconductor pattern AP, a source electrode SE branched from the data line DL, and a drain electrode DE spaced apart from the source electrode SE.

A protective layer 130 is arranged on the thin film transistor TR. The non-transmissive layer 140, the alignment layer 150, the first color filter layer CF1, and the first pixel electrode PE1 are sequentially arranged on the protective layer 130. In addition, the non-transmissive layer 140, the alignment layer 150, and the first color filter layer CF1 are partially removed from a region corresponding to the drain electrode DE to form a contact hole CH1, and the first pixel electrode PE1 is electrically connected to the drain electrode DE through the contact hole CH1.

The structure and function of the non-transmissive layer 140, the alignment layer 150, and the first color filter layer CF1 are the same as those of the non-transmissive layer 20 (shown in FIG. 2), the alignment layer 30 (shown in FIG. 2), and the first color filter layer CF1 (shown in FIG. 2) except that the non-transmissive layer 140, the alignment layer 150, and the first color filter layer CF1 are partially removed to form the contact hole CH1.

The second substrate 300 includes a second base substrate 310 and an opposite electrode 320 arranged on the second base substrate 310. The opposite electrode 320 forms an electric field with the first pixel electrode PE1 to control alignment of the liquid crystal 250.

Although not shown in FIGS. 5 and 6, according to an exemplary embodiment, an additional alignment layer may be arranged on the opposite electrode 320 in order to align the liquid crystal 250.

Referring to FIG. 7, the second color filter layer CF2 and the second pixel electrode PE2 are sequentially arranged on the alignment layer 150 corresponding to the second pixel area PA2, and the third color filter layer CF3 and the third pixel electrode PE3 are sequentially arranged on the alignment layer 150 corresponding to the third pixel area PA3.

Thus, a fourth light L4 transmitting through the second substrate 300 and being reflected by the second color filter layer CF2 has a wavelength corresponding to the second pitch P2 (shown in FIG. 3B) of the second cholesteric liquid crystal 51 (shown in FIG. 3B) included in the second color filter layer CF2. A fifth light L5 transmitting through the second substrate 300 and being reflected by the third color filter layer CF3 has a wavelength corresponding to the third pitch P3 (shown in FIG. 3C) of the third cholesteric liquid crystal 52 (shown in FIG. 3C) included in the third color filter layer CF3. In addition, a sixth light L6 that transmits through the second substrate 300 and travels to the peripheral area SA is absorbed by the non-transmissive layer 140.

Figure 8:
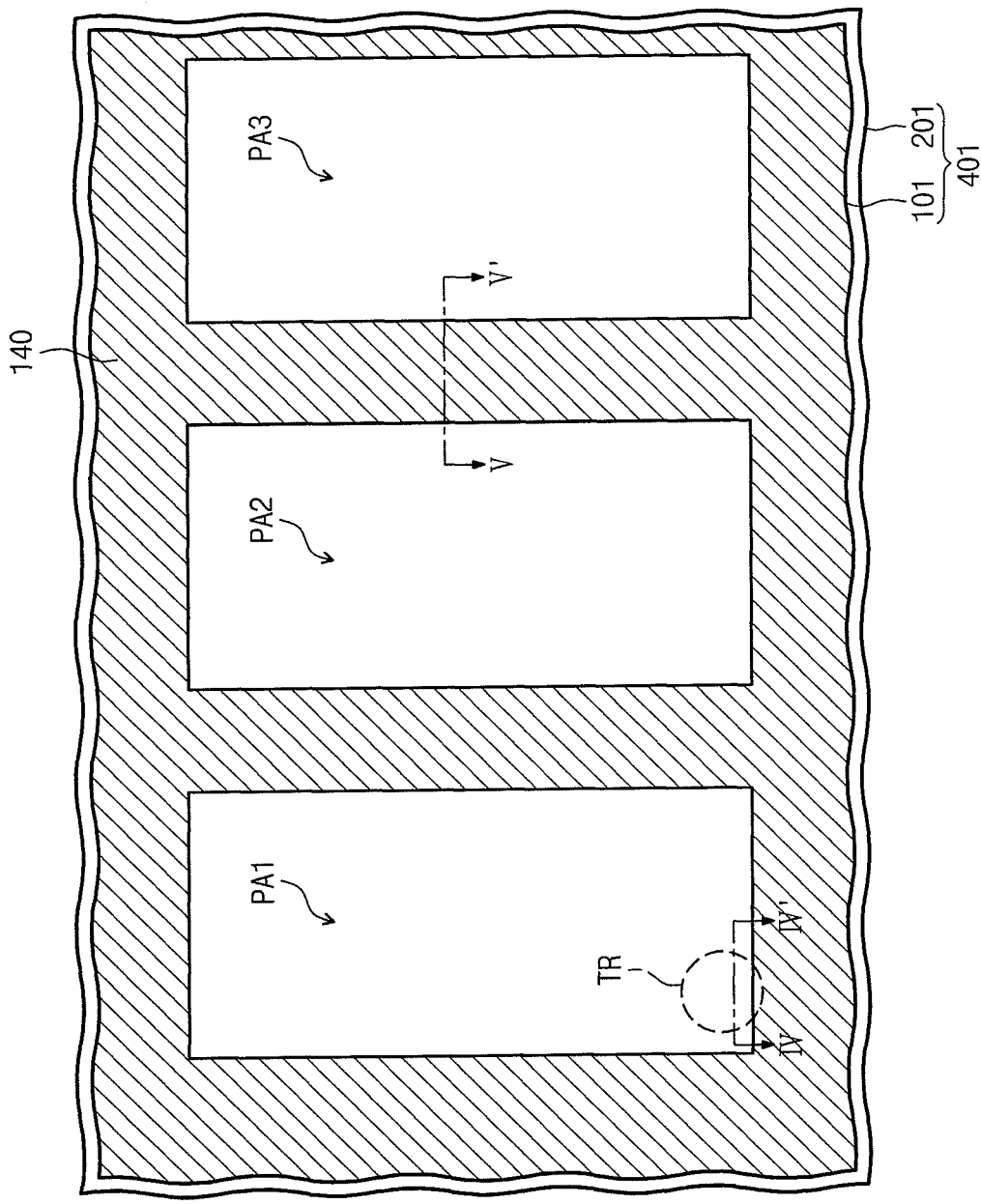
FIG. 8 is an enlarged plan view showing part of a liquid crystal display according to an exemplary embodiment of the present invention.
Figure 9:
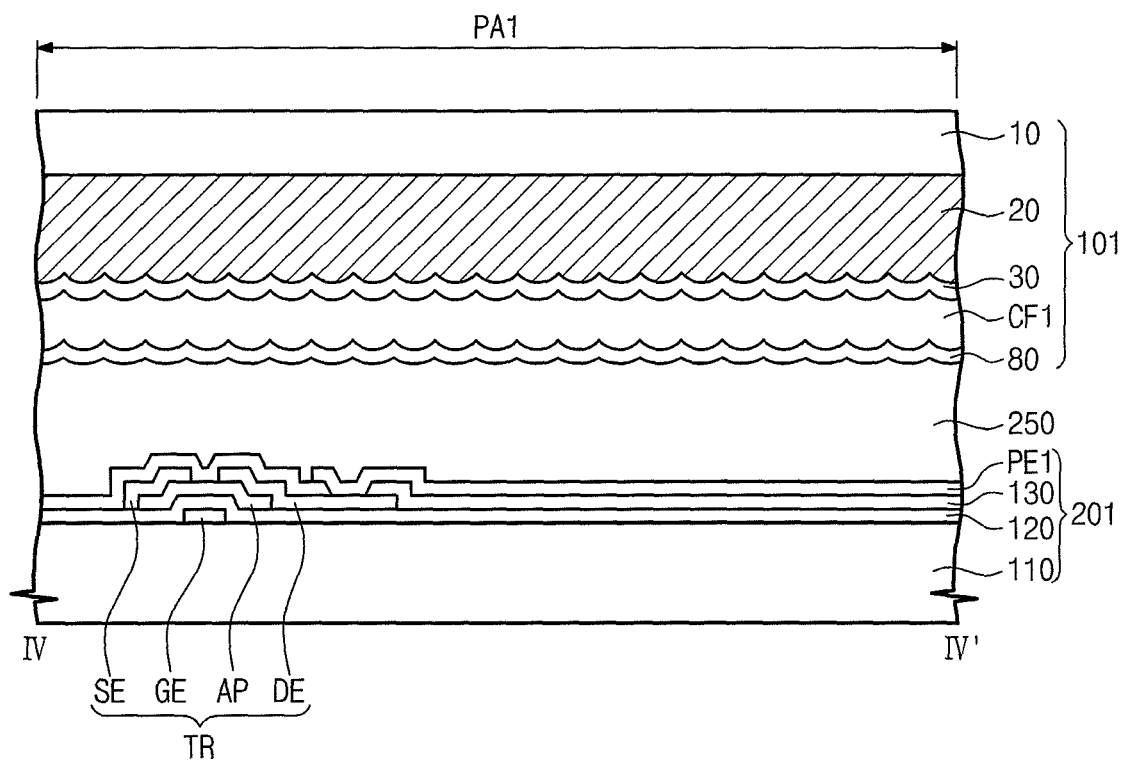
FIG. 9 is a cross-sectional view taken along a line IV-IV' of FIG. 8.
Figure 10:
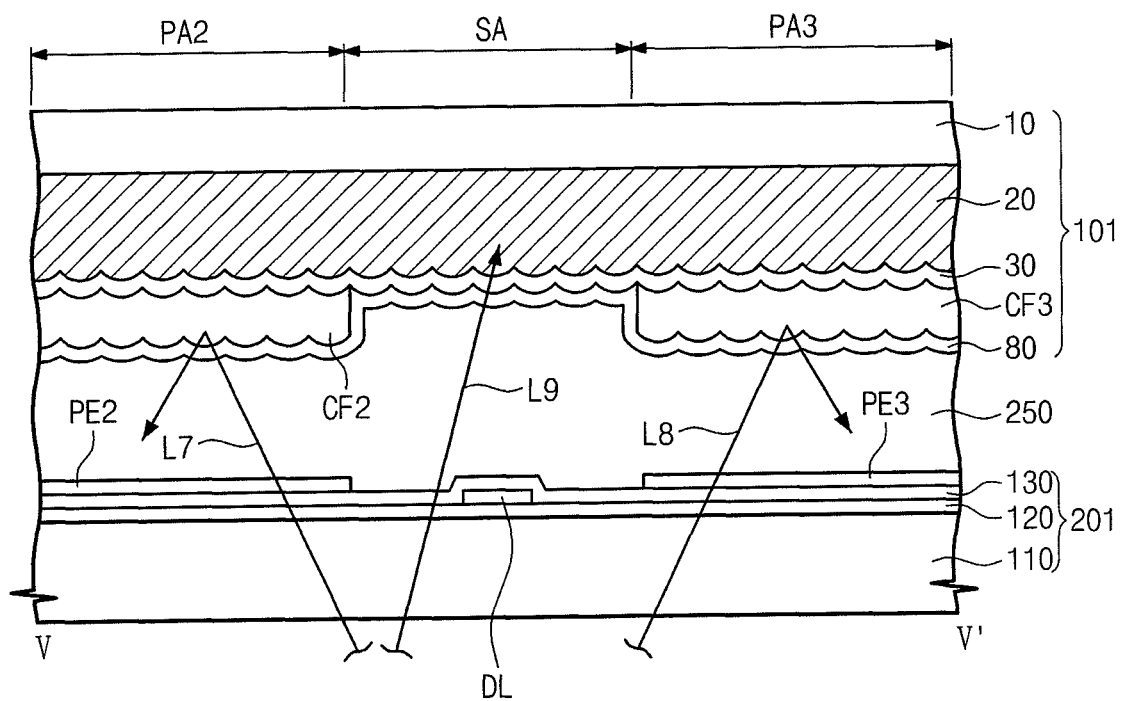
FIG. 10 is a cross-sectional view taken along a line V-V' of FIG. 8.

FIG. 8 is an enlarged plan view showing part of a liquid crystal display according to an exemplary embodiment of the present invention, FIG. 9 is a cross-sectional view taken along a line IV-IV' of FIG. 8, and FIG. 10 is a cross-sectional view taken along a line V-V' of FIG. 8.

Referring to FIGS. 8 to 10, a liquid crystal display 401 includes a color filter substrate 101 and an opposite substrate 201. The color filter substrate 101 has the same structure and function as those of the color filter substrate shown in FIG. 4.

The opposite substrate 201 has essentially the same structure as that of the first substrate 200 (shown in FIGS. 6 and 7) except that the non-transmissive layer 140, the alignment layer 150, and the first to third color filter layers CF1, CF2, and CF3 are removed from the opposite substrate 201. Consequently, first to third pixel electrodes PE1, PE2, and PE3 are arranged on a protective layer 130 in the opposite substrate 201.

Although not shown in FIGS. 9 and 10, an additional alignment layer may be arranged on the first to third pixel electrodes PE1, PE2, and PE3 in order to align a liquid crystal 250.

In the liquid crystal display 401 having the above-described structure, a seventh light L7 transmitting through the opposite substrate 201 from an external location and being reflected by the second color filter layer CF2 has a wavelength corresponding to a pitch of a cholesteric liquid crystal included in the second color filter layer CF2, and an eighth light L8 transmitting through the opposite substrate 201 and being reflected by the third color filter layer CF3 has a wavelength corresponding to a pitch of a cholesteric liquid crystal included in the third color filter layer CF3. Also, a ninth light L9 that transmits through the opposite substrate 201 from external location and travels to the peripheral area SA is absorbed by the non-transmissive layer 20.

The structure that includes the non-transmissive layer 20, the alignment layer 30, and the first to third color filter layers CF1, CF2, and CF3 may be employed in other display devices besides the liquid crystal display 401 in order to provide the white light in any desired color.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A liquid crystal display comprising:
a first base substrate;
a second base substrate facing the first base substrate;
a liquid crystal layer disposed between the first base substrate and the second base substrate;
a non-transmissive layer on the first base substrate and including concave-convex portions on a surface of the non-transmissive layer, wherein an upper surface of each of the convex portions is curved;
a plurality of color filter layers including a cholesteric liquid crystal, the color filter layers being arranged on the non-transmissive layer;
an alignment layer between the non-transmissive layer and the color filter layers;
a first electrode on the color filter layers; and
a second electrode on the second base substrate, wherein the first electrode includes a concave-convex structure corresponding to the concave-convex portions of the non-transmissive layer.

2. The liquid crystal display of claim 1, wherein
the first base substrate comprises a plurality of pixel areas and a peripheral area surrounding each of the pixel areas, and
the first electrode is divided into a plurality of first electrodes arranged to respectively correspond to each of the pixel areas.

3. The liquid crystal display of claim 2, wherein
the color filter layers change the wavelength of light transmitted through the second base substrate to reflect the light, and
the non-transmissive layer is positioned corresponding to the pixel areas and the peripheral area to absorb light transmitted through the second base substrate to the peripheral area.

4. The liquid crystal display of claim 3, further comprising a thin film transistor arranged on the first base substrate to correspond to each of the pixel areas and electrically connected to a corresponding first electrode of the plurality of first electrodes to switch an electrical signal provided to the corresponding first electrode,
wherein the non-transmissive layer includes a contact hole, and the corresponding first electrode is electrically connected to the thin film transistor through the contact hole.

5. The liquid crystal display of claim 3, wherein the alignment layer includes a plurality of concave-convex surfaces corresponding to the concave-convex portions, each of the concave-convex surfaces having a rounded shape, and a tangent line defined at a point of a surface having the rounded shape is substantially perpendicular to a rotation axis of the cholesteric liquid crystal adjacent to the point.

6. The liquid crystal display of claim 5, wherein the plurality of color filter layers respectively correspond to each of the pixel areas,
wherein the color filter layers comprise:
a first color filter layer including a first cholesteric liquid crystal twisted at a first pitch;
a second color filter layer including a second cholesteric liquid crystal twisted at a second pitch different from the first pitch; and
a third color filter layer including a third cholesteric liquid crystal twisted at a third pitch different from the first pitch and the second pitch.

7. The liquid crystal display of claim 1, wherein
the second base substrate comprises a plurality of pixel areas and a peripheral area surrounding each of the pixel areas, and
the second electrode is divided into a plurality of second electrodes arranged to respectively correspond to each of the pixel areas.

8. The liquid crystal display of claim 7, wherein
the plurality of color filter layers changes a wavelength of light transmitted through the second base substrate to reflect the light, and
the non-transmissive layer is positioned corresponding to the pixel areas and the peripheral area to absorb light transmitted through the second base substrate to the peripheral area.

9. The liquid crystal display of claim 8, further comprising a thin film transistor arranged on the second base substrate to correspond to each of the pixel areas and electrically connected to a corresponding second electrode of the plurality of second electrodes to switch an electrical signal provided to the corresponding second electrode.

10. The liquid crystal display of claim 8, wherein
the alignment layer includes a plurality of concave-convex surfaces corresponding to the concave-convex portions, each of the concave-convex surfaces comprises a rounded shape, and
a tangent line defined at a point of a surface having the rounded shape is substantially perpendicular to a rotation axis of a cholesteric liquid crystal adjacent to the point.

11. The liquid crystal display of claim 10, wherein the plurality of color filter layers respectively face each of the pixel areas,
wherein the color filter layers comprise:
a first color filter layer having a first cholesteric liquid crystal layer twisted at a first pitch;
a second color filter layer having a second cholesteric liquid crystal layer twisted at a second pitch different from the first pitch; and
a third color filter layer having a third cholesteric liquid crystal layer twisted at a third pitch different from the first pitch and the second pitch.

12. The liquid crystal display of claim 1, wherein the plurality of color filter layers and the alignment layer each have a concave-convex shape corresponding to the concave-convex portions.

13. A color filter substrate comprising:
a base substrate;
a non-transmissive layer on the base substrate and including concave-convex portions on a surface of the non-transmissive layer, wherein an upper surface of each of the convex portions is curved;
a plurality of color filter layers including a cholesteric liquid crystal,
the color filter layers being arranged on the non-transmissive layer, wherein an electrode is formed on the color filter layers; and
an alignment layer between the non-transmissive layer and the color filter layers, wherein the electrode includes a concave-convex structure corresponding to the concave-convex portions of the non-transmissive layer.

14. The color filter substrate of claim 13, wherein
the base substrate comprises a plurality of pixel areas and a peripheral area surrounding each of the pixel areas, and
each of the plurality of color filter layers is positioned to respectively correspond to each of the pixel areas.

15. The color filter substrate of claim 14, wherein the non-transmissive layer is positioned corresponding to the pixel areas and the peripheral area to absorb light traveling to the peripheral area from an exterior location.

16. The color filter substrate of claim 15, wherein
the alignment layer includes a plurality of concave-convex surfaces corresponding to the concave-convex portions, each of the concave-convex shapes having a rounded shape, and
a tangent line defined at a point of a surface having the rounded shape is substantially perpendicular to a rotation axis of a cholesteric liquid crystal adjacent to the point.

17. The color filter substrate of claim 16, wherein the color filter layers comprise:
a first color filter layer having a first cholesteric liquid crystal twisted at a first pitch;
a second color filter layer having a second cholesteric liquid crystal twisted at a second pitch different from the first pitch; and
a third color filter layer having a third cholesteric liquid crystal twisted at a third pitch different from the first pitch and the second pitch.

18. The color filter substrate of claim 13, further comprising a conductive layer arranged on the color filter layers.

19. The color filter substrate of claim 13, wherein the plurality of color filter layers and the alignment layer each have a concave-convex shape corresponding to the concave-convex portions.

* * * * *